(No Model.)　　　　　　　　　　　　　　　　　5 Sheets—Sheet 1.
E. E. O'HALLORAN.
APPARATUS FOR DRAFTING PATTERNS FOR GARMENTS.
No. 431,781.　　　　　　　　　　Patented July 8, 1890.
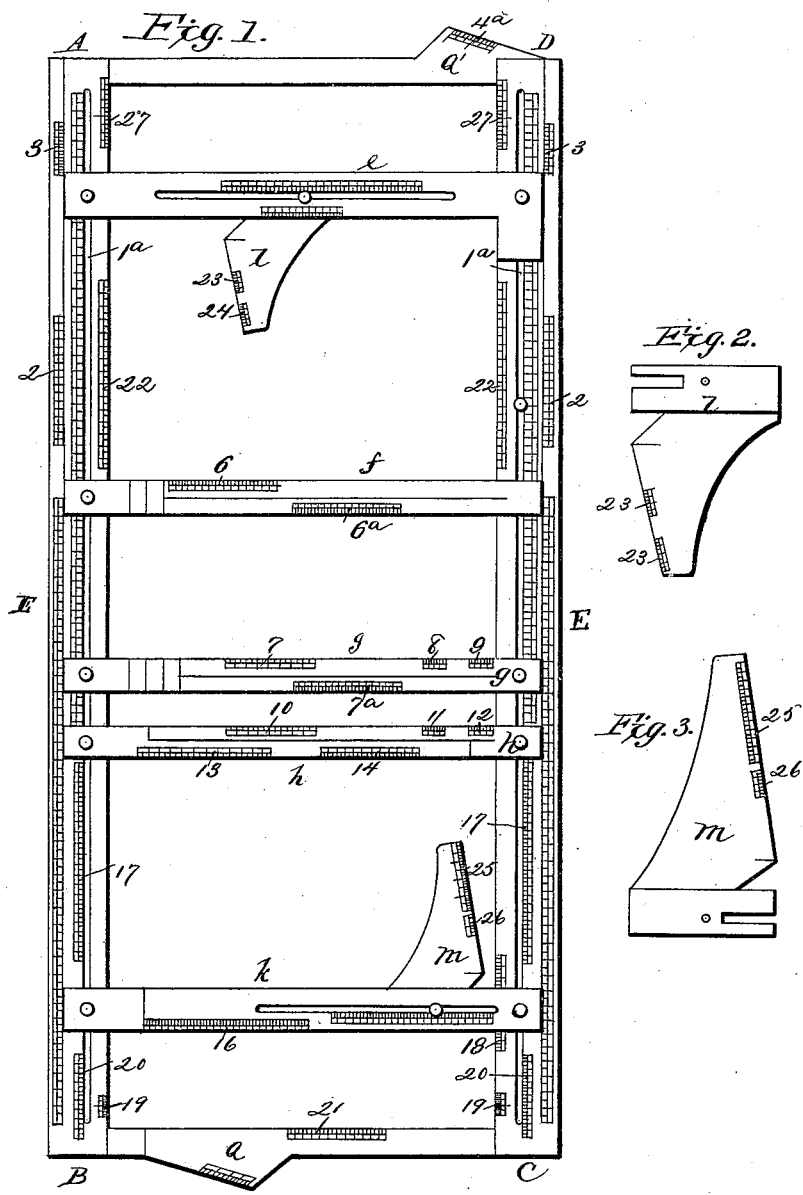
WITNESSES:
Fred G. Dieterich
Fred. N. Stearns,
INVENTOR:
E. E. O'Halloran.
BY
ATTORNEYS (No Model.) 5 Sheets—Sheet 2.
E. E. O'HALLORAN.
APPARATUS FOR DRAFTING PATTERNS FOR GARMENTS.
No. 431,781. Patented July 8, 1890.
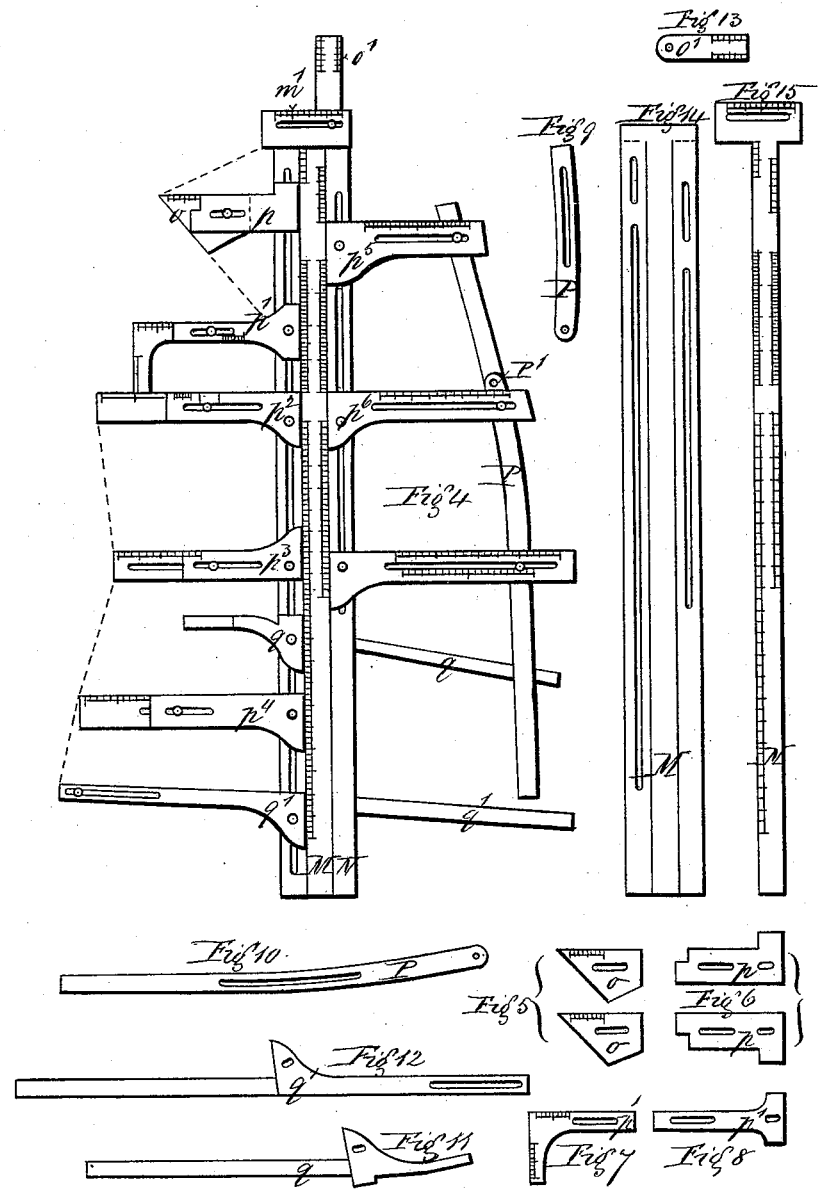
Witnesses
Fred G. Dieterich
Fred H. Stearns,
Inventor
Eugene E. O'Halloran
By Munn & Co.
Attorneys (No Model.) 5 Sheets—Sheet 3.
E. E. O'HALLORAN.
APPARATUS FOR DRAFTING PATTERNS FOR GARMENTS.
No. 431,781. Patented July 8, 1890.
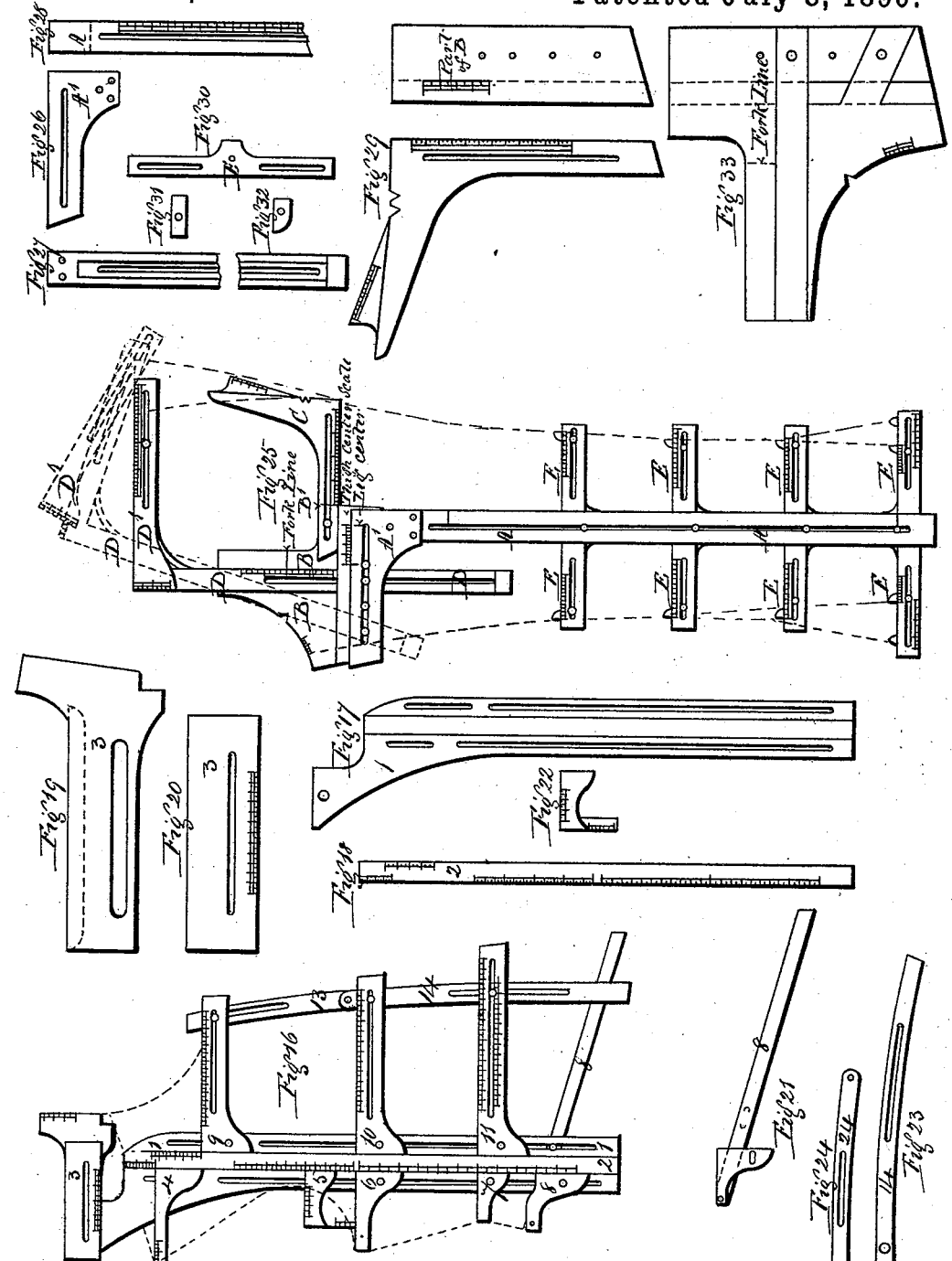
Witnesses
Fred G. Dieterich
Fred H. Stearns
Inventor
Eugene E. O'Halloran
by Munn & Co
Attorneys (No Model.)  E. E. O'HALLORAN.  5 Sheets—Sheet 4.
APPARATUS FOR DRAFTING PATTERNS FOR GARMENTS.
No. 431,781.  Patented July 8, 1890.
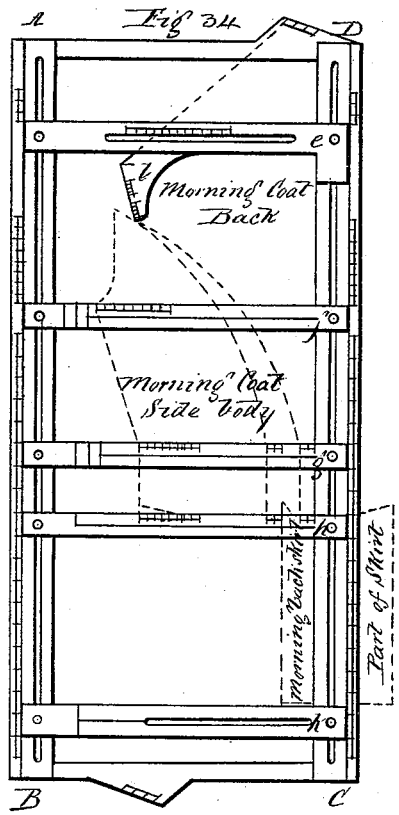
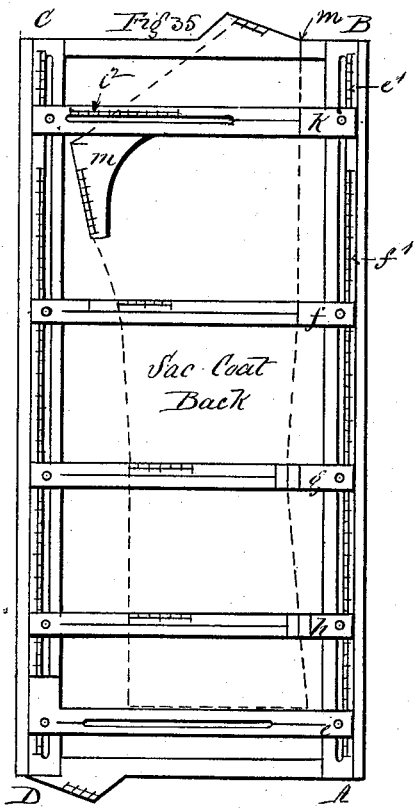
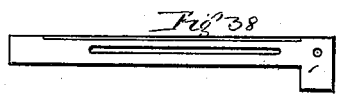
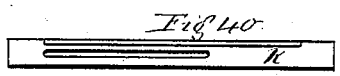
Witnesses
Fred G. Dieterich
Fred H. Stearns
Inventor
Eugene E. O'Halloran
By Munn & Co.
Attorneys (No Model.) 5 Sheets—Sheet 5.
E. E. O'HALLORAN.
APPARATUS FOR DRAFTING PATTERNS FOR GARMENTS.
No. 431,781. Patented July 8, 1890.
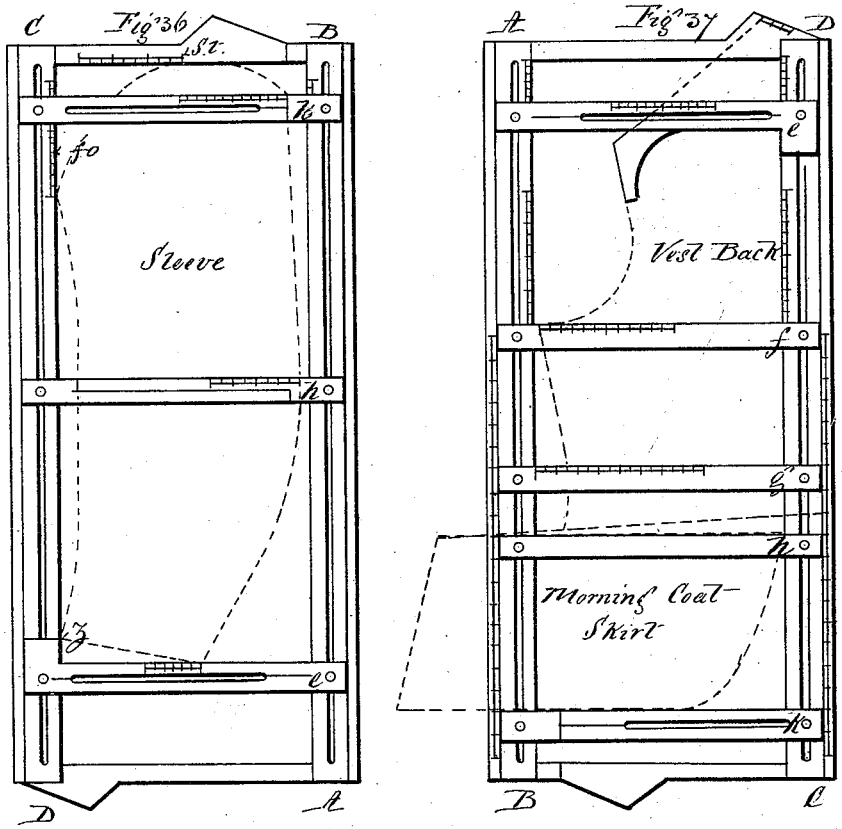
Witnesses
Fred G. Dieterich
Fred H. Stearns
Inventor
Eugene E. O'Halloran
By Munn & Co.
Attorneys

UNITED STATES PATENT OFFICE.

EUGENE EDWARD O'HALLORAN, OF WAIPAWA, NEW ZEALAND.

APPARATUS FOR DRAFTING PATTERNS FOR GARMENTS.

SPECIFICATION forming part of Letters Patent No. 431,781, dated July 8, 1890.

Application filed August 19, 1889. Serial No. 321,037. (No model.)

*To all whom it may concern:*

Be it known that I, EUGENE EDWARD O'HALLORAN, a British subject, residing at Waipawa, in the Provincial District of Hawkes Bay, in the Colony of New Zealand, have invented a new and useful Apparatus for Drafting the Patterns of Garments, of which the following is a specification.

My invention relates to a new or improved apparatus for drafting the patterns of garments, and has for its objects enabling tailors to quickly produce in various shapes and dimensions patterns of suits in various sizes.

In order that my invention may be most easily understood, I will now proceed to describe the same, and for that purpose shall refer to the accompanying sheets of drawings, on which similar letters of reference indicate corresponding parts.

Figure 1 is the plan of my apparatus as designed for patterns of skirts, sleeves, side bodies, and coat and vest backs. Fig. 2 shows the shoulder-slide of the same detached. Fig. 3 shows another shoulder-slide of the same detached. Fig. 4 is the plan of my apparatus as designed for patterns of coat fore parts. Figs. 5 to 15, inclusive, show details of the several parts of Fig. 4 when detached. Fig. 16 is the plan of my apparatus as designed for vest fore parts. Figs. 17 to 24, inclusive, show plans of some of the several parts of Fig. 16 when detached. Fig. 25 is the plan of my apparatus as designed for patterns of trousers, pants, knickers, and leggins. Figs. 26 to 33, inclusive, show plans of some of the several parts of Fig. 25. Figs. 34 to 37, inclusive, show my apparatus as in Fig. 1, as applied to each purpose, but with certain scales left out in each view to simplify explanation. Figs. 38 to 41 are plans of some of the parts of the same.

A B C D, in Figs. 1, 34, 35, 36, and 37, are a square frame, on the longest sides of which are arranged scales of lengths and depths of garments alike on either side.

$e f g h k$ are cross-bars sliding freely along slots in the sides A B C D, as shown, and which are held in position firmly when required by set-screws or any other suitable fastenings. On these bars are marked scales of width and marks which represent points in the outlines of the patterns.

$l m$ are shoulder-slides, sliding along the bars $e$ and $k$, respectively, and on which are fixed scales of depth. The scales numbered 1 to 14, inclusive, refer to vest and morning patterns, 1, 2, and 3 being repetitions on either side to keep the bars square. The numbers on these scales are placed in such a manner that they can be read when the bar D C is before the operator; but to read the remaining scales the instrument must be turned round so that the bar A B is toward the reader. Thus, in using Figs. 34 and 37 the bar C D is toward the operator, whereas in Figs. 35 and 36 the bar A B is toward the operator.

In Fig. 4, M and N form the center rib of my apparatus as designed for drafting coat fore parts, and on these are depth and length scales, and a width-scale for neck-points at top $m'$.

O is a small sliding scale.

$p, p', p^2, p^3, p^4, p^5, p^6$, and $p^7$ are slides for measuring widths. $p\, p'\, p^2 p^3 p^4$ are compound slides capable of sliding both lengthwise and crosswise of the apparatus, so as to register the measure in any direction. $p'$ has a vertical as well as a horizontal scale. $p^5, p^6$, and $p^7$ have a bar P attached to them and free to slide on the same, and which is jointed at P'.

$q\, q'$ are sliding bars for a purpose to be hereinafter described.

Numbers 1 and 2 form the center rib of my apparatus as designed in Fig. 16, and on these are depth and length scales.

3 is a cross or neck slide with vertical and horizontal scales.

4, 5, 9, 10, and 11 are slides having a longitudinal motion on the center rib and horizontal scales.

6, 7, and 8 are without scales.

5 has a vertical as well as a horizontal scale.

13 and 14 are bars similar to P in Fig. 4, and for a similar purpose.

Figs. 17 to 24, inclusive, are sketches of the several parts detached.

A A A forms the center rib of my apparatus as designed in Fig. 25, having a head A'.

B B is a body-piece to set out the fork of the trousers, and also to carry the side-seam slide C, which has a longitudinal and vertical scale, and also on this body B B is carried the sliding square D D and the leg-center slide A'.

D D is a square having a vertical and a horizontal scale, and is free to move on the head A'.

D' is a piece having a horizontal and vertical scale, and free to move on a pin on the square D.

E E E, &c., are slides free to move in A, and having horizontal scales, as shown.

Figs. 26 to 33, inclusive, show the several parts in detail.

Having now described the several parts of my apparatus, I will proceed to explain the method of setting out a garment, and for that purpose I will first describe the sack-coat. I place the frame A B C D on the paper or cloth on which I require to describe the pattern, and I do so with the side D C toward me and D to my right hand. This frame has now, as shown in Fig. 35, the proper scales for the purpose, (some of those shown in Fig. 1 not being necessary for the operation.) The scales and the purpose for which they are used are marked on the instrument and face me, so as to be easily read. Having taken the chest-size required, which is from No. 24 to No. 48 for sack-coats, or, say, No. 48 size, I fix the right-hand edge of the shoulder-bar $l$ against No. 48 on the scale $e'$ and screw fast. I then move the shoulder-slide $m$ from me also to No. 48 on the width-scale $e^2$. Next, I fix the sack arm-hole bar $f$ with its right-hand edge against No. 48 on scale $f'$ and fasten, as before. Next, I place the waist-bar $g$ with its right-hand edge to the scale $g$, at the position required for waist-length of coat, the scale being in actual inches as measured from the neck. I now place the sack seat-bar $h$ with its right-hand edge against the measure on the scale $g$; and, lastly, I similarly place the sack full-length bar $e$ against the desired length on scale $g$ and make all fast by the screws. On the outside bar, to my extreme right, is a mark $m$, which indicates the commencement of the center seam of the back, and on the bars $k$ $f$ $g$ $h$ are similar marks, which also indicate the center seam. On bars $g$ and $h$ there are three marks, which can be used according to the judgment and the circumstances for stooping, erect, or normal shaped figures. By drawing a line, as shown dotted, the back seam is finished. On the outside bar, to my extreme right, is an angular projection, which has the form of the back-neck, and by marking off the No. 48 on the diagonal upon the same, I find the neck-point of the shoulder-seam. By drawing a line from this neck-point to a point marked at the angle of the shoulder-slide $m$, I form the shoulder-seam. No. 48 on the scale $l'$ of the shoulder-slide $l$ will be the side-seam point, which I join by a line to the shoulder-point. On the side-seam width-scale of the bar $f$ $g$ $h$, I find the number 48 and trace the shape of the said seam through the said points from 48 on the shoulder-slide. The pattern is then complete and contains all the allowances for making up, which allowances have been accurately calculated for in drawing the scales. This completes the pattern of the back. By apparatus, as shown in Fig. 4, I draft the fore part of the sack-coat. Having placed the apparatus with the curved bar P toward me, and the scale of neck-points $m'$ to my right, I move the shoulder-bar $h$ until its right-hand edge marks 48 on its scale on the bar $m$, having previously adjusted the angular plate $o$ also to 48 on the bar $p$. Next, I move the bar $h^5$ on its scale on center bar $m$. I now place the bars $p^2$ and $p^6$ with their right-hand edges against No. 48 of arm-hole and breast-depth scales of the bar $m$. I slide out the slide of $P^2$ to No. 48, also the slide of $P'$ to 48, and the horizontal scale of the said slide $P'$ to 48. Next, I adjust natural-waist bars $P^3$ and $P^7$ to the measured length by the measure of $m$ and adjust its slide to 48. The bar $q'$ is then adjusted to the proper measured distance for the full length of garment. The jointed bar P is now set to No. 48 on the bars $p^5, p^6$, and $p^7$. It is evident that by drawing lines, as shown by the dots on Fig. 4 and around the bar P, a proper pattern may be easily made, and that such pattern can be altered and varied in its proportions, as required. The slide O', fixed by a swivel-pin to the bar $m$ $n$, has a scale similar to back-neck neck-scales of Fig. 1, and serves as a check for regulating the distance from extreme back of neck to waist-length of bar $P^3$ in abnormal and normal patterns. I will now describe the setting out of the sleeve. Fig. 36 shows my apparatus as applied to drafting sleeves, but is drawn to similar scale. Having placed the side C D next to me, with the end A D to the right, on the right-hand end of the bar A B is a scale for sleeve hind-arm depths and a similar scale on D C. I fasten the right-hand edge of bar K against 48 on these scales. I then set off from the same edge the length of the elbow and full length of the sleeve by moving the bars $h$ and $e$ (to the measure taken) on the sides for the purpose, no other scale being required, but for which an ordinary tape may be used. No. 48 on $fo$, or forearm-scale, and 48 on $st$ sleeve-top scale, and 48 of sleeve hind-arm scale are points which show the outline of the sleeve. The line marked "sleeve-seam" on bar $h$, and 48 on scale marked "sleeve-elbows" of bar $h$, and 48 on sleeve-cuffs scale of bar $e$, together with the point $z$ on bar $e$ give points through which the diagram of the sleeve may be drawn, as shown by the dotted line. It is of course apparent that any other size could similarly be set off, the size 48 being only taken as an example. It is evident from this description of a sack-coat that the pattern of a vest may be set out in a similar manner, the instructions being recorded on this and the other instruments.

To give a brief description of the forming of the vest-patterns, the bars 13 and 14 form in Fig. 16 the front edge of a waistcoat-pattern from top of front neck to the full length required. The bar 8, which is fixed by a swivel-pin to its slide 8, forms the lower edge of the waistcoat to the shape required. The ends of the bars 6, 7, and 8 give the outline points of side seam, and the dotted lines, which are indicated on the scales (similar to those described for the coat,) will complete the pattern.

To draft a design for trousers, I use my apparatus as shown in Fig. 25. Having placed the apparatus lengthwise before me with angle of the square D to the right, and remembering that 48 is still the size selected for the suit, I slide the leg-center mark on the slide A' against the No. 48 on thigh-center scale of body part B and fasten it there. I then draw out the side-seam slide c until 48 appears against the body part at B', as shown, and then fix by the screw. Next, I slide the square D to the right until the length of body on the square D appears against the fork-line, as shown, and then fasten by screw. Next, I set the knee-bar E to its proper position, as the natural measure indicates on the measured bar A, and so on, with the other bars E and lower bars E measuring the full length of the trousers. On the end bar to the left are scales on both edges to set out the width of back and front portions of the trousers. The top edge of the square D represents the waist from the fly to the hip, and has the scale of waist-measures upon it, and the slide C, when drawn out to 48, forms the position of the side seams or tops and under sides of the pattern. The projecting indicators shown with set-screws on the bar E with scales can be set to all the required sizes of different-sized persons. On the square D is placed a movable piece D', with vertical and horizontal scales, which are used to regulate the width and shape of the top waist. The square D, as shown, fixed at right angles with the instrument, is used for indicating the shape of the front of the body. It will be perceived that it is also shown in another position, and serves to indicate the seat and waist-seam of the back body portion of the pattern.

By this apparatus complete sets of patterns, in size varying from 24 to 48, breast and sack measure, (which are the usual sizes required by tailors,) may be drafted with great facility and dispatch, while the shape may be almost infinitely varied to suit the proportions of normal and abnormal figures by adjusting the several parts relatively to each other by aid of the several scales marked on the instrument.

What I claim is—

In a tailor's pattern-drafting apparatus, the combination, with the rectangular frame having slotted and graduated side bars, and the graduated cross-bars $f$ $g$ $h$, adjustably secured to said side bars, of the longitudinally-slotted cross-bar, which is adjustably secured in a similar manner and graduated, as specified, and an angular-shaped shoulder-slide, which is adjustably secured on said cross-bar and arranged diagonally within and in relation to said frame, as shown and described.

EUGENE EDWARD O'HALLORAN.

Witnesses:
  HENRY HUGHES,
  W. E. HUGHES.